(12) United States Patent
Sonnek

(10) Patent No.: US 6,405,679 B1
(45) Date of Patent: Jun. 18, 2002

(54) TWO PART MARTIN BIRDHOUSE WITH PNEUMATIC POLE

(76) Inventor: Norbert P. Sonnek, 56721-190th St., Wells, MN (US) 56097

( * ) Notice: Subject to any disclaimer, the term of this patent is extended or adjusted under 35 U.S.C. 154(b) by 0 days.

(21) Appl. No.: 09/588,012

(22) Filed: Jun. 6, 2000

(51) Int. Cl.$^7$ .............................................. A01K 31/00
(52) U.S. Cl. ..................................... 119/432; 119/435
(58) Field of Search ................................ 119/430, 431, 119/432, 433, 434, 435, 438; 254/93 R

(56) References Cited

U.S. PATENT DOCUMENTS

| | | | | |
|---|---|---|---|---|
| 1,916,878 A | * | 7/1933 | Anklam | 119/432 |
| 3,696,792 A | * | 10/1972 | Bruhns | 119/23 |
| 3,792,685 A | * | 2/1974 | Wiener | 119/23 |
| 3,804,066 A | * | 4/1974 | Lowe | 119/23 |
| 3,814,059 A | * | 6/1974 | Eickhof | 119/23 |
| 4,357,860 A | * | 11/1982 | Krzak | 98/33 R |
| 4,442,793 A | * | 4/1984 | Overpeck et al. | 119/23 |
| 4,702,198 A | * | 10/1987 | Holyoak | 119/23 |
| 5,540,017 A | * | 7/1996 | Eilam et al. | 52/118 |
| 6,009,837 A | * | 1/2000 | McClasky | 119/428 |

* cited by examiner

Primary Examiner—Peter M. Poon
Assistant Examiner—Timothy D Collins

(57) ABSTRACT

An improved plastic colony bird house with nesting compartments, especially for purple martins. This invention is made of two main sections: a round outer shell that rotates about and is easily removed from the second main section, an inner core of pie shaped nesting compartments. The removal of the outer shell facilitates the easy cleaning of the nesting compartments with a simple garden hose at the end of the nesting season. The outer shell has multiple ingress and egress holes of sufficient size to allow easy access. The vertical wall dividers, separating each nesting compartment, feature a short horizontal plane making a tee structure. The outer shell can be rotated to the closed position, which places the tee structure at each entrance hole, thus blocking the entrance to the nesting compartments to unwanted species of birds. When the first migrating purple martins are seen in the area, the outer shell can be rotated to the open position to allow entrance to the nesting compartments. This invention features an improved, segmented pole using pressurized air from an air compressor to raise and lower the bird house. Air pressure is superior to the use of water pressure as the air will not freeze in cold climates. In addition, the use of tight fitting reducing collars and a small hole at the air pressure intake site, allows for the controlled descent of the birdhouse at the end of the season to keep from causing injury to the person maintaining the bird house.

2 Claims, 4 Drawing Sheets

Figure 1:
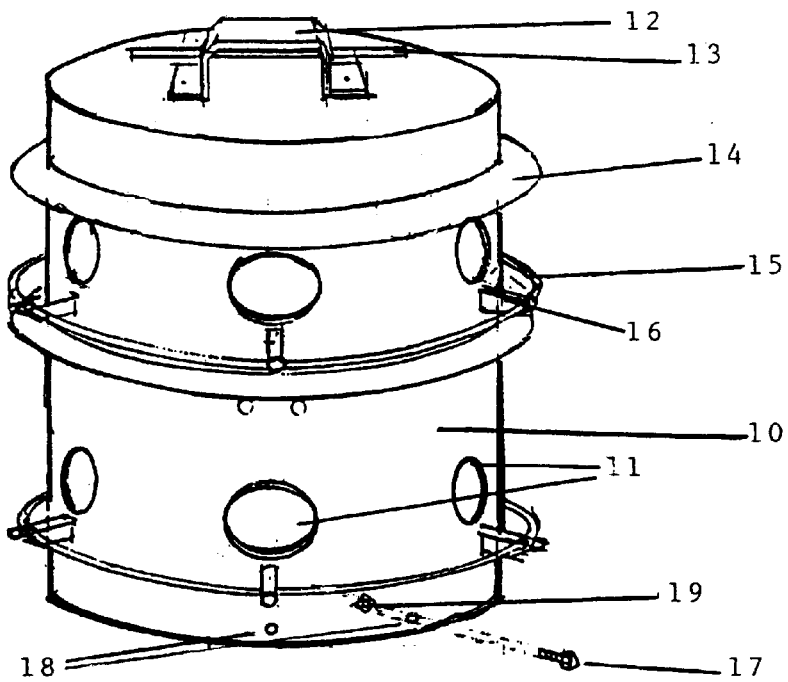

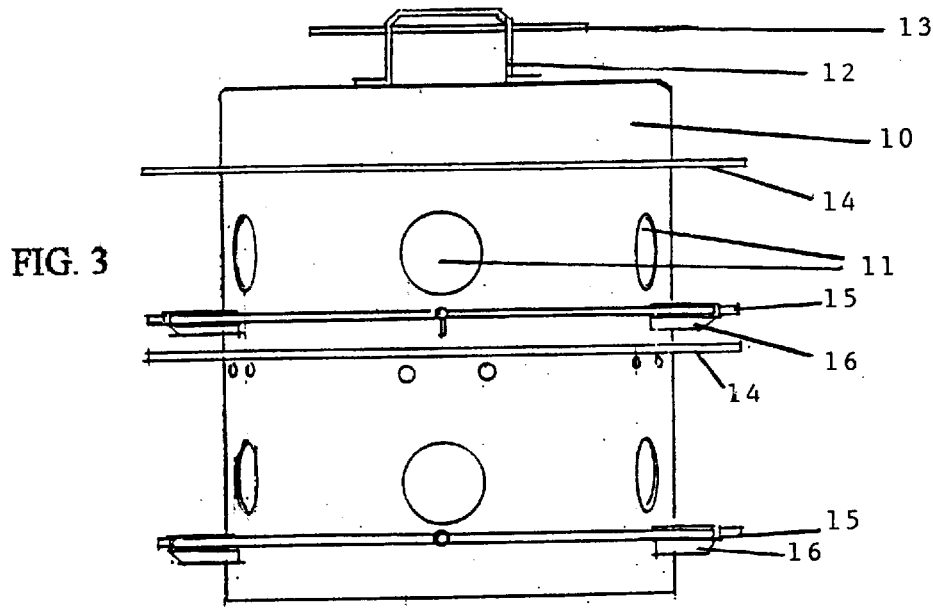
FIG. 3
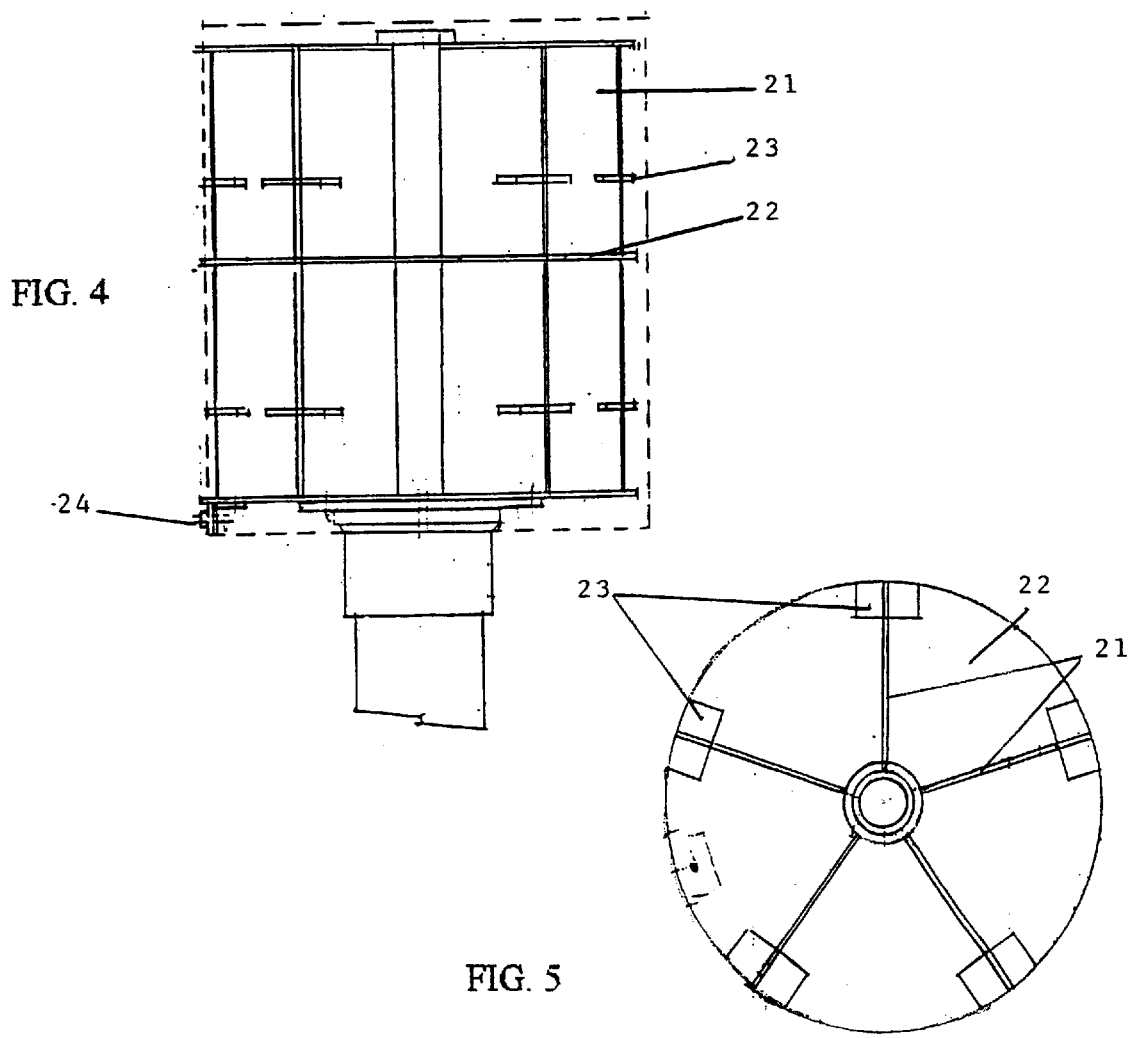
FIG. 4
FIG. 5

TWO PART MARTIN BIRDHOUSE WITH PNEUMATIC POLE

BACKGROUND—Field of Invention

This invention relates to an easy to clean, round cylindrical, white plastic birdhouse, especially for colonies of purple martins. The birdhouse consists of two main parts: an outer shell fitting over and enclosing an inner core of nesting compartments. The birdhouse sits atop a segmented pole, which is raised and lowered by use of an air compressor making the birdhouse easily accessible.

BACKGROUND—Description of Prior Art

Many bird enthusiasts seek to encourage the native bird species of purple martins to take up residence in their neighborhoods by erecting birdhouses on poles. Purple martins are especially desired since their diet consists mainly of flying insects such as mosquitoes, wasps, flies and beetles. Early Native Americans hung dried gourd birdhouses to encourage purple martins to take up residence and eat the flying insects in the area.

Purple martins are migratory birds that winter in South America. When spring arrives in the United States in areas east of the Rocky Mountains, the purple martins migrate north to feast on flying insects and begin nest building. Many bird enthusiasts track the large flocks of northbound migrating purple martins along their flight path. Purple martin scouts lead the way and seek out the best nesting sites. However, other bird species, such as barn sparrows and starlings, can arrive before the purple martins and claim all nesting sites, thereby forcing the purple martins to look elsewhere. It becomes crucial to have a birdhouse or nesting compartment clean and free of other birds at the time the purple martin arrives in order to attract them to the desired location.

Purple martins are social birds that prefer to live in colonies with close proximity to humans. A traditional birdhouse with room for one nest would not be a desirable location for a purple martin. U.S. Pat. No. 4,442,793 by Overpeck describes a single nest birdhouse. An apartment style birdhouse with numerous nesting compartments would more readily attract purple martins to your backyard. U.S. Pat. No. 6,009,837 by McClasky, U.S. Pat. No. 3,804,066 by Lowe, U.S. Pat. No. 3,792,685 by Wiener and U.S. Pat. No. 4,702,198 by Holyoak describe colony type birdhouses or multi-dwelling birdhouses. The purple martin birdhouses featured in *Birdhouses and Feeders You Can Make* by Gerhards, 1999, and *Making Fancy Birdhouses and Feeders* by Self, 1988, also show multi-dwelling compartments. However, the shape of most of these birdhouses is along the more traditional style with square sides and edges and a typical pointed roof U.S. Pat. No. 3,696,792 by Bruhns is another multi-dwelling birdhouse with flat sides and a pointed roof. The shapes and styles and colors of these birdhouses are meant to blend in with the human neighborhood, to look like the house of a human. The Holyoak colony birdhouse has a cylindrical shape.

To attract purple martins to your backyard, it is important to build a house that suits the birds and yet makes it easy for humans to maintain the birdhouse on behalf of the birds. The male martin will arrive first and show off his feathers to attract the female martin to a suitable nest. In a colony birdhouse the male martin will protect two or three adjacent nesting compartments. The male martin wants to attract many females until one female chooses one of his guarded nesting compartments. Even after the female has started nest building in one of the sites, the male martin still protects adjacent nesting compartments. The male martin will also build a partial nest in one of the adjacent sites. The adult purple martins will use the adjacent nest site when the offspring grow and make the initial nest site too crowded. The flat sides of a traditional colony birdhouse make it easier for a male martin to protect two or three nesting compartments. When a male martin protects empty nest sites it reduces the number of active nests and the number of fledglings produced.

It is also critically important that the purple martin birdhouse be orientated to the same compass direction each season as in the original position. This will ensure that the purple martin can locate the same birdhouse used on a previous visit.

Both the McClasky patent and the Bruhns patent, mentioned above, incorporate a telescoping pole as part of their birdhouse patents. U.S. Pat. No. 5,540,017 by Eilam describes a telescoping flagpole that could be used as a pole for a birdhouse. U.S. Pat. No. 4,357,860 by Krzak describes a horizontal telescoping conduit using pressurized air to lengthen a cylinder.

There are a number of disadvantages in all of the above mentioned birdhouses and telescoping poles.

(1) Birdhouses that have flat sides can blunt the wind and therefore be more vulnerable to being blown down in a spring or summer storm. The flat sides make it easier for the male martin to protect more than two empty nest sites. This will reduce the number of potential martins to the colony.

(2) Birdhouses made totally of wood or metal or having wood or metal parts are apt to rot or rust and be expensive to replace. Even those birdhouses with parts that are wood or metal will face deterioration of important features.

(3) Most current patented birdhouses may need annual painting to keep them blending in with the human neighborhood.

(4) Birdhouses that have numerous parts make it more difficult for the enthusiast to erect the house, maintain the house and close the house down over the winter.

(5) The square edges of most traditional looking birdhouses provide an angle for a predator squirrel to use as a lever to withdraw eggs or fledglings from a nest.

(6) Telescoping poles can be difficult for a bird enthusiast to raise and lower. The weight of a colony birdhouse can be heavy and difficult to raise manually as it requires some strength. Telescoping poles that are lowered too quickly, by the weight of the birdhouse, can cause fingers to be pinched in the segmented parts of a telescoping pole. A colony birdhouse being lowered too quickly can also knock against the head or face or eyes of a person trying to close the birdhouse down for the winter.

(7) If the nesting compartment entrances are not aligned in the same direction as when the purple martins originally used them, it can decrease the chance that the birds will return to the same location the following season.

SUMMARY

In accordance with the present invention, a colony purple martin birdhouse made with polymerized vinyl compound (PVC) parts is all white, cylindrical and consists of only two main parts: an outer shell 10 and an inner core 20 of nesting compartments. The outer shell 10 fits over and encloses the inner core 20 of nesting compartments. The bottom of the nesting compartments is a round flat plate 22 on a horizontal plane. The sides of the nesting compartments are two nesting compartment dividers 21 on vertical planes. The outer shell 10 forms the remaining wall to enclose each nesting compartment. The outer shell 10 has a handle 12 on its topmost position to facilitate removal. The handle 12 on the outer shell 10 is pierced through with a bird perch 13 on a horizontal plane. The outer shell 10 has a plurality of holes 11 that form the entrance and egress to the nesting compartments when fitted over the inner core 20. The outer shell 10 is perfectly aligned with the inner core 20 so that one entrance hole 11 is centered on only one nesting compartment of the inner core 20. The outer shell 10 and inner core 20 are locked in place by means of a nylon bolt 17 penetrating through an opening 18 on the outer shell 10 and passing through a hole 25 in a bracket 24 on the inner core 20 securing the two parts firmly together. A nylon nut 19 secures the nylon bolt 17 from movement. The outer shell 10 is ringed with a perch 15 directly below the entrance and egress holes 11 to enable birds to feed fledglings in the nesting compartments. The perch 15 is secured to the outer shell 10 by a plurality of pegs 16. The perch 15 also assists fledglings make their initial flights from the nest. The outer shell 10 is ringed with a weather guard 14 above the entrance and egress holes 11 to prevent rain from entering the nesting compartments. Any small droplets of rain that may enter the nesting compartment area will slide down through the gap created between the outer shell 10 and the inner core 20.

It is desirable to prevent other species of birds from taking up residence in this birdhouse to ensure the space for purple martins. A ¼ rotational turn of the outer shell 10 will align the entrance and egress holes 11 with the nesting compartment dividers 21 and prevent entrance to all nesting compartments. Each nesting compartment divider 21 is installed with a small cross beam 23 in a horizontal plane that creates a tee section at the entrance and egress holes 11 and effectively blocks the entrance to the nesting compartment when in this closed position. The outer shell 10 and inner core 20 are locked in place in this closed position with the same nylon bolt 17. The nylon bolt 17 pierces through the hole 18 of the outer shell 10, then through the hole 25 of bracket 24 of the inner core 20 and being secured by the nylon nut 19.

The segmented round, telescoping pole is raised and lowered by using a standard air compressor (not shown). The pole consists of two pole segments: the top pole segment 30 having a slightly smaller diameter than the bottom pole segment 31 and fitting inside the bottom pole segment 31. The birdhouse is attached to the top of the top pole segment 30. The bottom pole segment 31 is embedded in the ground preferably surrounded by a layer of pea rock. The bottom pole segment 31 is encapsulated at its bottom end by a pipe cap 36. The pipe cap 36 features a small outlet at its base for water drainage. A small hole near the base of the bottom pole segment 31 connects with an intake tube 33 of sufficient length to allow the intake tube 33 to protrude above ground level and be connected to an air compressor unit or pneumatic device. Pressurized air is pumped through the intake tube 33 into the underground portion of the bottom pole segment 31. The air pressure inside the chamber of the bottom pole segment 31 increases and urges the top pole segment 30 in an upward motion thereby raising the top pole segment 30, with the birdhouse attached, to its fill height. The top pole segment 30 is fitted with two stabilizing collars 32 near the bottom end of the pole. The stabilizing collars 32 encircle the pole and fit snugly against the inside chamber of the bottom pole segment 31 thereby preventing the release of air from the pressurized chamber. Under the urging of the pressurized air in the chamber, the top pole segment 30 raises until it is fully extended. When the top stabilizing collar on the top pole segment 30 comes in contact with the PVC reduction fitting 34, securely adhered at the top of the bottom pole segment 31, further extension of the pole is prevented. The stabilizing collars 32 ensure that a portion of the top pole segment 30 remains firmly inside a portion of the bottom pole segment 31. This feature prevents any wobbling of the segmented pole. The two pole segments are then locked in place by means of a nylon locking pin 35 inserted in a horizontal plane. The locking pin 35 penetrates through the reduction fitting 34, sitting atop the bottom pole segment 31, and continues penetrating through the lower portion of the top pole segment 30. Thus the two pole segments are locked together. This will maintain the fill extension of the two pole segments. The locking pin 35 maintains the birdhouse in the same directional orientation each time it is raised and lowered.

At the end of the season, the locking pin 35 is manually removed from the reduction fitting 34. The weight of the birdhouse and top pole segment 30 bearing down causes the pressurized air inside the chamber to be gradually reduced. As the pressurized air is emitted, the top pole segment 30 lowers slowly inside the bottom pole segment 31. The top pole segment 30 will lower until it comes in contact with a stabilizing collar 37 attached to the inside of the bottom pole segment 31. The stabilizing collar 37 prevents the top pole segment 30 from contact with the pressurized air inlet of the intake tube 33. The segmented pole is then at its lowest level and the outer shell 10 of the birdhouse can be easily removed for cleaning of the nesting compartments of the inner core 20.

OBJECTS AND ADVANTAGES

The objects and advantages of the present invention are:
(1) A round birdhouse without flat sides would be more apt to weather a strong wind since the wind would be directed around the contour of a round birdhouse rather than hitting a flat side with force. A round colony birdhouse also makes it more difficult for the male martin to protect more than two nesting compartments. The male martin can protect the initial nest for the offspring plus an adjacent nesting compartment to be used by the male and female. The round shape of this birdhouse makes it more difficult for the male martin to protect more than two nesting compartments. The other nesting compartments would be out of his field of sight. This feature of a round birdhouse enables more martins to take up residence in the birdhouse as fewer empty nesting sites are protected.
(2) A plastic birdhouse would not rot or rust thus making it easier for the human landlord to maintain the colony of desired birds. A plastic birdhouse would not deteriorate due to rain and wind and sun as a wood or metal birdhouse is prone to do.
(3) It is known that the purple martin prefers an all white nesting site. Perhaps this is due to the male purple martin having dark feathers that would stand out against a white background as it sings to attract the female to an appropriate nesting site. The all white color also reflects heat making it more comfortable for the birds. An all white plastic birdhouse suits the needs of the purple martin.

(4) Many amateur bird enthusiasts will become discouraged if it is too difficult or takes too much time to erect the birdhouse. If the maintenance is too difficult or too time consuming the bird enthusiast will not do it and that lessons the chance that purple martins will be attracted to the same location again the following year. A birdhouse with just two parts makes it quite easy for the bird enthusiast to maintain the house throughout the cycle of the purple martins in residence and upon their leaving. The adhesive used in the construction of the plastic birdhouse is water-resistant and is therefore not compromised when the nesting compartments are cleaned under the pressure of water from a garden hose at the end of the season. Thus the bird enthusiast can easily clean the spent nests and related deposited materials and is more likely to attract the birds again the following season.

(5) The round contours of the present invention make it difficult for a predator to find an angle to use as leverage to withdraw eggs or fledglings from the nesting compartments.

(6) This segmented or telescoping pole is used with an air compressor and requires little physical effort by the bird enthusiast. The pneumatic pole is designed to eliminate the potential hazards of pinching fingers or having a birdhouse fall too quickly or requiring great strength to raise the birdhouse. An air compressor hose is attached to the tube near the base of the pole. The air compressor forces air into the inside chamber of the bottom pole and raises the top pole segment to the desired height where it is locked in place. To raise the pole and birdhouse in this manner takes about 30 seconds. The pole apparatus is sealed and little air escapes. At the end of the season, the locking mechanism is released and the pole slowly emits the pressurized air and lowers itself for cleaning.

(7) The locking pin penetrates the reduction fitting attached to the top of the bottom pole and also then penetrates through the top pole segment securing one to the other. This penetration and alignment of the two pole segments, and thereby the birdhouse, ensures the same directional orientation of the birdhouse is always observed.

DESCRIPTION OF DRAWING FIGURES

FIG. 1 is a perspective view of the outer shell of the birdhouse that fits over, rotates about and encloses the inner core. Note the nylon bolt 17 that locks the outer shell in the open or closed position, after rotation of the outer shell about the inner core.

Figure 2:
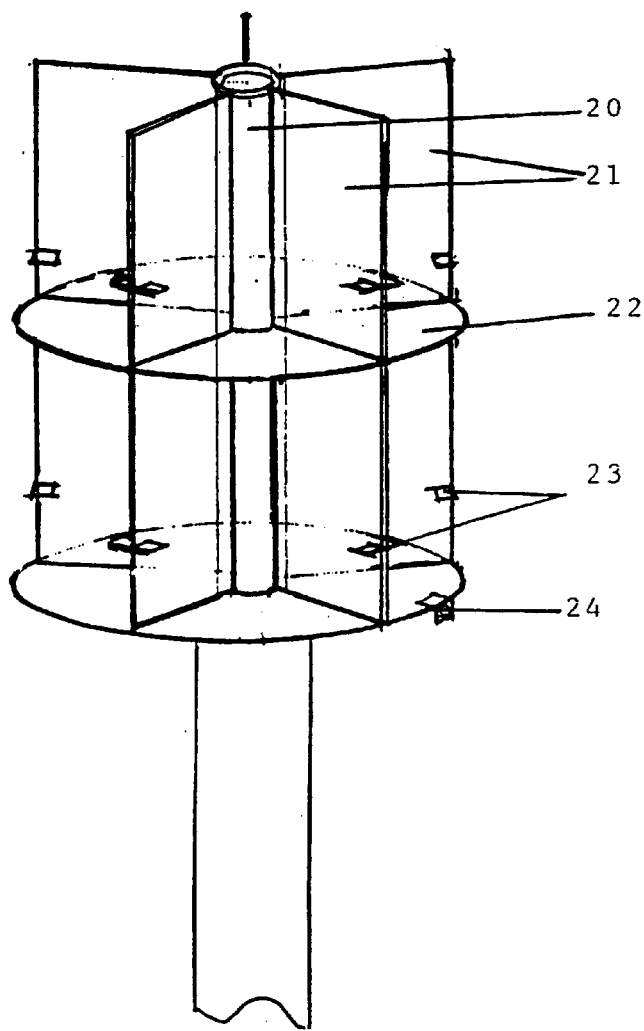

FIG. 2 is a perspective view of the inner core of pie shaped nesting compartments. The inner core fits under and inside of the outer shell, FIG. 1, which encloses it. These two parts, FIG. 1 and FIG. 2 are easily disengaged from one another to facilitate easy cleaning of the nesting compartments.

FIG. 3 is a side view of the outer shell, FIG. 1. This drawing clearly shows the weather guard rim 14 above the series of entrance holes to deter rain water from entering the nesting compartments. This drawing also shows the position of the perch 15 just beneath the series of entrance holes to assist feeding and flight.

FIG. 4 is a side view of the inner core, FIG. 2, demonstrating how the outer core, FIG. 1, fits over the inner core, FIG. 2.

FIG. 5 is a plane view of the inner core, FIG. 2, of pie shaped nesting compartments with horizontal planes 23 making a tee structure with the vertical wall dividers 21 separating each nesting compartment. Note the horizontal planes 23 do not diminish the space in the nesting compartment but are of sufficient length to obstruct the entrance holes when the outer shell, FIG. 1 is rotated to the closed position.

Figure 6:
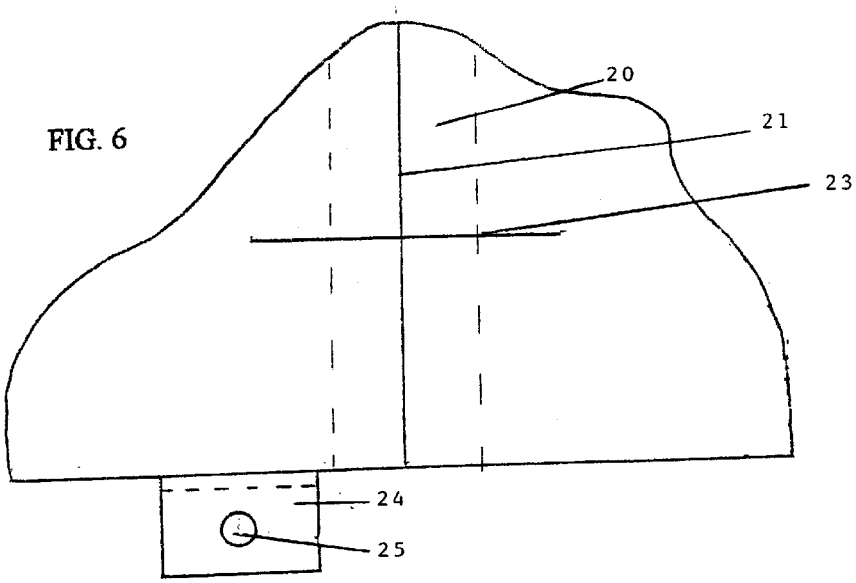

FIG. 6 is a side view of a single vertical nesting compartment wall divider 21 with horizontal plane 23 making a tee structure to block the entrance to the nesting compartment when the outer shell, FIG. 1 is in the closed position. This drawing also features the locking bracket 24 to maintain the bird house in the closed or open position.

Figures 7, 8:
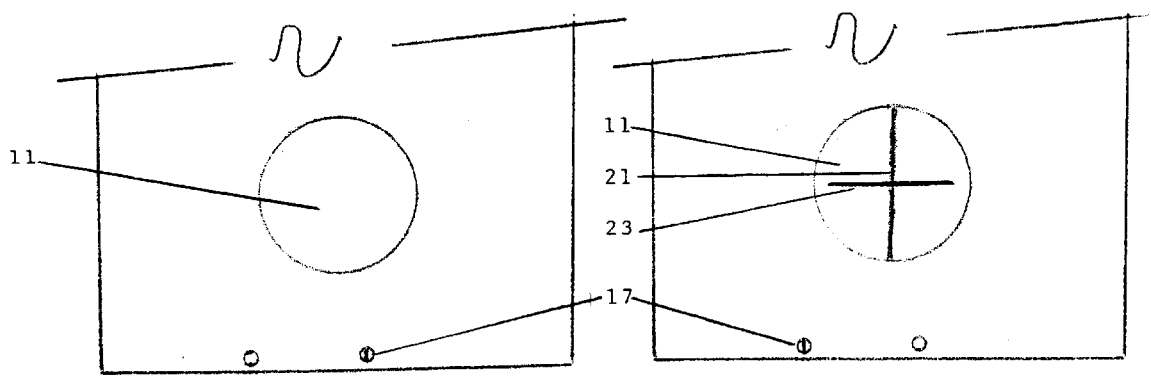

FIG. 7 is a view of a single entrance and egress hole in the open position. Note the nylon bolt 17 maintains the outer shell, FIG. 1, in the open position.

FIG. 8 is a view of a single entrance hole in the closed position. The vertical wall divider 21 with horizontal bar 23 make a tee structure that blocks the entrance hole to any bird species. Note the nylon bolt 17 maintains the outer shell, FIG. 1, in the closed position. When the migrating purple martins are first observed in a particular geographic area, the outer shell, FIG. 1, is rotated to the open position, FIG. 7. This feature ensures that no unwanted bird species can inhabit any nesting compartment in the bird house prior to the arrival of the purple martins.

Figure 9:
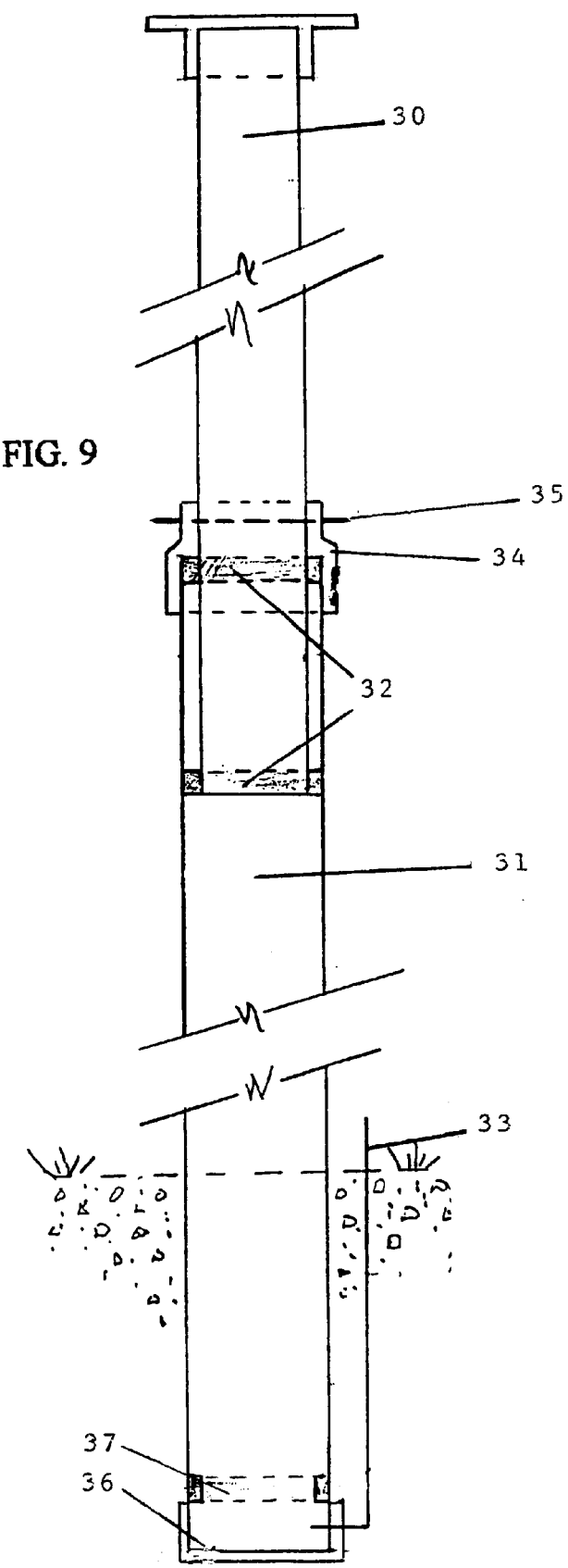

FIG. 9 is a side view of the pneumatic, segmented pole planted in the ground. The locking pin 35 secures the top pole segment at the highest elevation. The upper end of the tube 33 is to be connected to an air compressor (not shown) which uses air pressure to raise the top pole segment with attached bird house.

What is claimed is:

1. A cylindrical birdhouse made of white, plastic material comprising (a) a cylindrical outer shell fitting over and enclosing an inner core of pie shaped nesting compartments;

(b) a means for the said outer shell to rotate about and be removed from said inner core;

(c) a plurality of entrance and egress holes in the said outer shell;

(d) vertical plane wall dividers between each said nesting compartment;

(e) a horizontal plane, of sufficient length, forming a cross beam tee section, attached to each said vertical plane wall divider;

(f) a means for the said horizontal plane to obstruct entrance to the said nesting compartments to unwanted species of birds, upon rotation of the said outer shell to the closed position; and (g) a means for the said horizontal plane to not obstruct entrance to the nesting compartments upon rotation of the said outer shell to the open position whereby the removal of the said outer shell avails the said nesting compartments to easy cleaning.

2. A round, segmented pole made of white, plastic material in combination with a birdhouse, comprising (a) two segments in a vertical plane;

(b) a top segment being of smaller diameter than a bottom segment;

(c) the said top segment sliding inside the said bottom segment;

(d) a locking pin of sufficient length to penetrate through both the said top segment and said bottom segment to hold the said two segments in place at the uppermost elevation;

(e) stabilizing collars encircling and adhered to the bottom end of said top segment (f) a reduction fitting adhered to the top of the said bottom segment to prevent escape; of air from inside pole chamber (g) a tube with its lower end connected to the bottom of the said bottom segment;

(h) a small hole for said tube of said bottom segment;

(i) a hole at a sufficient angle to the ground to eliminate soil from the inside of the said bottom segment and allow for drainage of rain water and (j) a means for the upper end of said tube to allow air, under pressure from an air compressor, into the chamber of the said bottom segment, whereby urging the said top segment, with the birdhouse attached, to rise to its highest elevation.

* * * * *